(12) United States Patent
Kirschey

(10) Patent No.: US 8,393,973 B2
(45) Date of Patent: Mar. 12, 2013

(54) COUPLING WITH AN ANNULAR COUPLING BODY

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 17 days.

(21) Appl. No.: 12/948,879

(22) Filed: Nov. 18, 2010

(65) Prior Publication Data

US 2012/0058831 A1    Mar. 8, 2012

(30) Foreign Application Priority Data

Nov. 18, 2009   (DE) .......................... 10 2009 053 725

(51) Int. Cl.
*F16D 3/68* (2006.01)

(52) U.S. Cl. .......................................................... 464/93

(58) Field of Classification Search ............... 464/81, 464/85, 87, 92–96; 74/72, 572.2
See application file for complete search history.

(56) References Cited

U.S. PATENT DOCUMENTS 7,458,896 B2 *  12/2008  Kirschey ........................ 464/92
7,980,123 B2 *   7/2011  Ussery

FOREIGN PATENT DOCUMENTS

| DE | 102008015810 A | 10/2008 |
| DE | 202008015810 U1 * | 2/2009 |

* cited by examiner

*Primary Examiner* — Gregory Binda
*Assistant Examiner* — Josh Skroupa
(74) *Attorney, Agent, or Firm* — Andrew Wilford

(57) ABSTRACT

A coupling element for connection between a drive member and a driven member for transmitting torque has at least two similar part-circularly arcuate coupling bodies each formed by an arcuate row of elastomeric segments alternating with and vulcanized to rigid elasticity-limiting elements. The rows terminate at end parts formed with axially or radially through-going holes for attachment to the drive and driven members. A hinge assembly allows movement of the part-circular coupling bodies between a closed position forming a closed circle centered on an axis and an open position.

16 Claims, 10 Drawing Sheets

COUPLING WITH AN ANNULAR COUPLING BODY

FIELD OF THE INVENTION

The present invention relates to a coupling. More particularly this invention concerns a coupling with an annular coupling body.

BACKGROUND OF THE INVENTION

A typical wedge packet a coupling has an essentially annular coupling body formed by a number of individual, elastomeric segments, into which end parts with attachment holes as well as elasticity-reducing elements have been vulcanized for mounting at a driving and at a driven machine component or member. Such generic wedge packet couplings and are primarily used in rail track vehicles, such as in particular street cars. Here, they couple the transmission with the shaft that connects the wheels of the traction unit.

The wedge packet coupling is a markedly rigid coupling, in which the elasticity of its rubber elements is further reduced by metal plates vulcanized into it.

In the prior art, a single coupling segment consists, for example, of two outer end parts mounted on the spokes of a star-like hub and house between them a middle coupling element connected by axial holes with a drive flange. As a rule, at the drive member and the driven member six individual segments that are equipped in this way are thus attached to each other, so that the segments overall form an approximately annular coupling body.

When putting together the individual coupling segments for a wedge packet coupling, attention must be paid that the elasticity values of the individual segments with respect to each other are substantially identical. Otherwise, the coupling would shift eccentrically during operation in the direction of the weakest segment, which leads to non-round operation and significant material load. Therefore, it is necessary in the prior art that the individual segments be tested with respect to their elasticity values and that they are put together into is coupling component assembly sets. Within the scope of production and storage, this leads to an expense that is not insignificant.

OBJECTS OF THE INVENTION

It is therefore an object of the present invention to provide an improved annular coupling body.

Another object is the provision of such an improved annular coupling body that overcomes the above-given disadvantages, in particular that does not require the prior art testing and storage effort.

SUMMARY OF THE INVENTION

A coupling element for connection between a drive member and a driven member for transmitting torque has according to the invention at least two similar part-circularly arcuate coupling bodies each formed by an arcuate row of elastomeric segments alternating with and vulcanized to rigid elasticity-limiting elements. The rows terminate at end parts formed with axially or radially throughgoing holes for attachment to the drive and driven members. A hinge assembly allows movement of the part-circular coupling bodies between a closed position forming a closed circle centered on an axis and an open position.

This way, the segments form two one-piece, approximately annularly semicircular coupling elements, and the two annularly semicircular coupling elements are connected by a hinge-like coupling element and form a one-piece, essentially annularly semicircular coupling body.

The important advantage of the invention is that the individual segments are undetachably connected with each other. The hinges are in a particularly preferred manner material-locking components consisting of the same material of the elastomeric body. These are obtained directly by vulcanizing and are formed like integral hinges. As the conditions for vulcanizing the individual segments of a coupling that is manufactured in such a way are identical, the segments also have identical elasticity and damping values. Due to their undetachable fixation to each other, they are associated with each other and ready for assembly. The costly elasticity test of the individual segments known from prior art, as well as the sorting and the corresponding storage of individual segments of the same type, is eliminated.

Beyond that, there is also a surprisingly positive effect for the assembly process. Instead of having to laboriously true a number of individual segments, the annular coupling body can be expanded and, for example, be placed around a cylinder-like hub. It is then radially bolted down to the hub and then connected with an adjacent flywheel by axial holes in corresponding end parts. As the result of this, the use of star hubs that are costly to produce is superfluous. At the same time, advantages of the coupling as per DE 20 2008 015 810 are also realized, in which a generic coupling was proposed that exerts the required radial prestress onto the individual segments of the coupling body by a radial mount.

If the individual segments form only two coupling elements, that a hinge-like connection piece integrally links to each other, this increases the stability of the connection of the individual segments among each other with the same, previously cited advantages.

It is proposed that the hinge-like connection piece is vulcanized onto a first end part.

Depending on standards it is conceivable that the hinge is mounted directly at two adjacent end parts, or that the hinge is fastened directly at an end part and at an adjacent extension.

The extension is then in particular provided for the purpose that one annularly semicircular coupling element can be mounted operationally secure to the other annularly semicircular coupling element Beyond that, especially preferred is also an embodiment that characterizes itself in that the hinge connects the parts of a two-part end part that is split step-like with each other.

This has the important advantage that the connection of the individual segments or the two annularly semicircular coupling elements takes place due to the use of the mounting bolt for mounting the coupling at the drive member or the driven member. No additional assembly steps are required for affixing the segments to each other.

Thereby, it is provided in particular that the end part, intersecting the longitudinal axis of the attachment hole, is split, in particular cutting horizontally.

BRIEF DESCRIPTION OF THE DRAWING

The above and other objects, features, and advantages will become more readily apparent from the following description, reference being made to the accompanying drawing in which the same reference numerals are used for functionally identical structure in the various views and where in.

SPECIFIC DESCRIPTION

Figure 1:
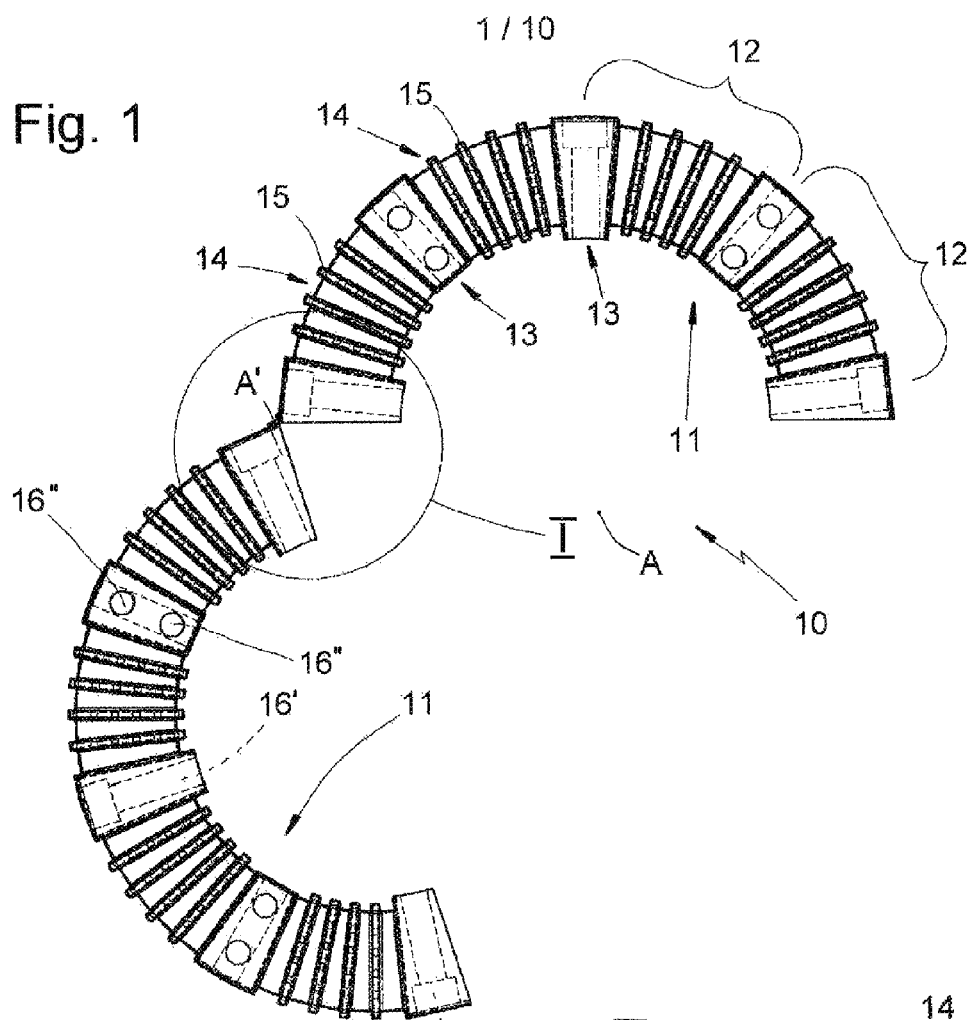
FIG. 1 is an end view of first embodiment of a coupling in accordance with the invention in open position.
Figure 2:
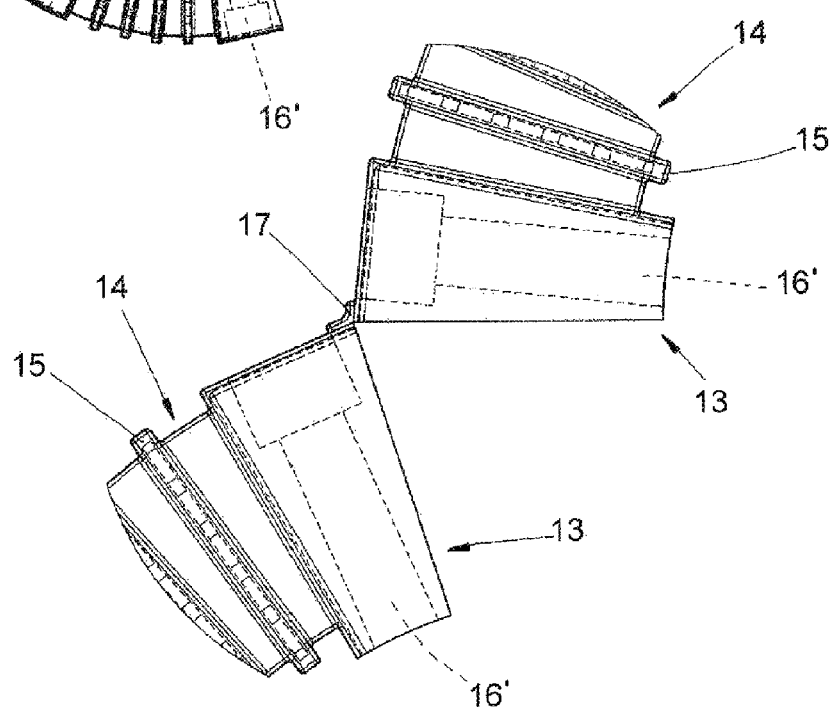
FIG. 2 is a large-scale view of the detail shown at I in FIG. 1.

As seen in FIGS. 1 to 4, a first embodiment of a coupling 10 comprises first two outer coupling elements 11 that are half rings, in particular annularly semicircular, and formed by individual segments 12. Each segment 12 comprises two end parts 13, as well as a rubber body 14 mounted between them. To decrease the elasticity of the rubber bodies 14, respective elasticity-reducing metal plates 15 are vulcanized into them. The end parts 13 are provided with attachment holes 16' that extend radially (FIG. 1 parallel to the view plane) or holes 16" that extend axially (FIG. 1 into the view plane) with respect to the axis of rotation A of the coupling 10. The semicircularly arcuate coupling elements 11 of the coupling 10 are made by vulcanization, so that the metal plates 15, as well as also the metallic end parts 13 are vulcanized onto the rubber bodies 14.

In order to obtain a one-piece coupling 10, two of the end parts 13 that are vulcanized onto the coupling elements 11 adjacent each other are connected together by a hinge 17 (see FIG. 2) defining a respective pivot axis A' parallel to the axis A. This hinge 17 is preferably of one integral piece and of the same elastomer as the rubber bodies 14. It is vulcanized onto the radial outer surface in the connection section of the end parts 13 that lie directly adjacent each other during the same vulcanization process in which the coupling 10 is manufactured.

Figure 3:
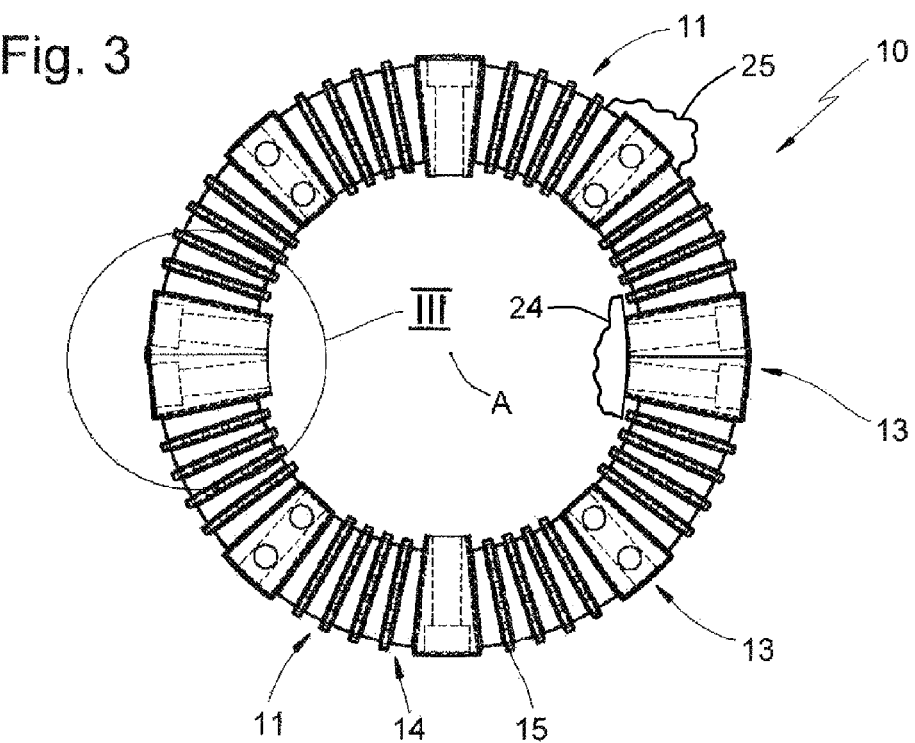
FIG. 3 is the coupling of FIG. 1 in closed position.
Figure 4:
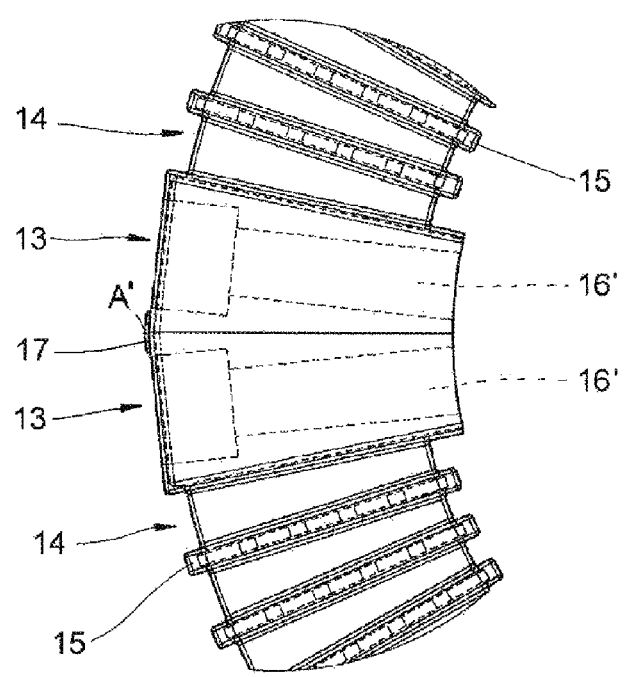
FIG. 4 is a large-scale view of the detail shown at III in FIG. 3.
Figure 5:
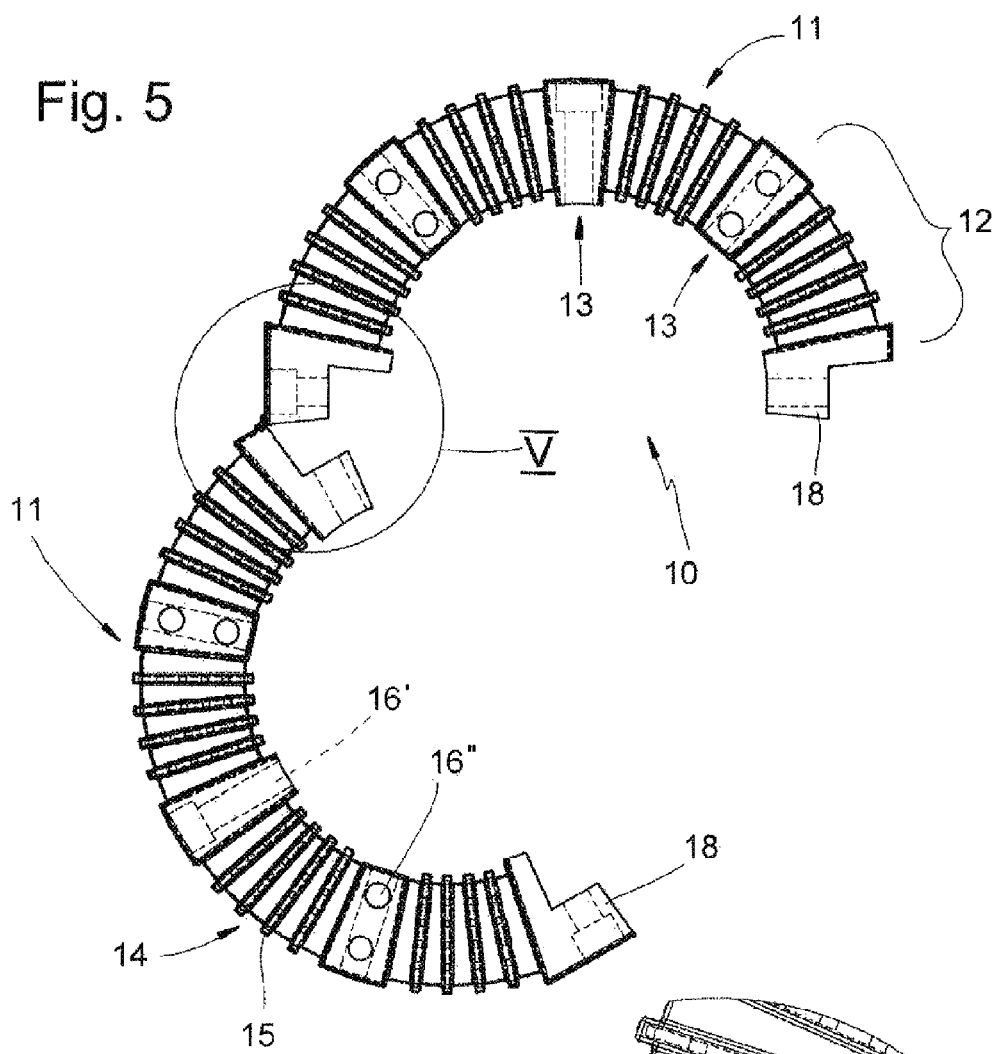
FIG. 5 is an end view of second embodiment of a coupling in accordance with the invention in open position.
Figure 6:
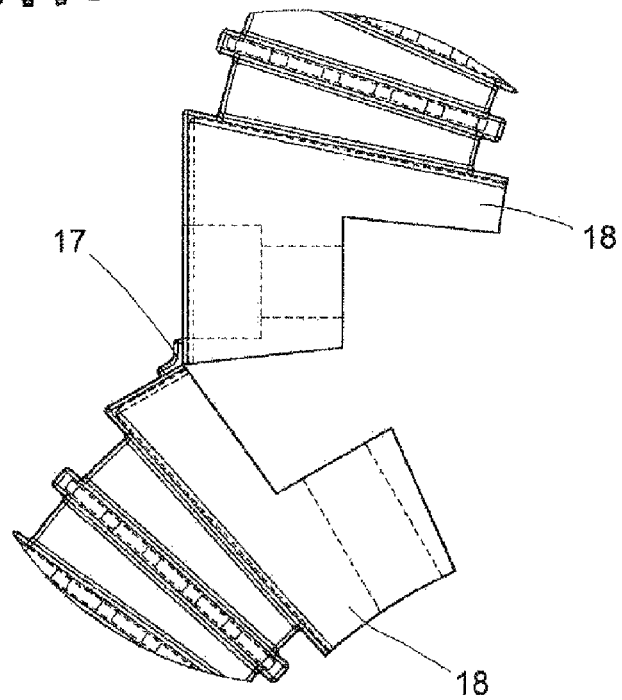
FIG. 6 is a large-scale view of the detail shown at V in FIG. 5.

FIG. 3 shows the coupling 10 according to FIG. 1 in its closed position. To get into this position, the semicircularly arcuate coupling elements 11 are pivoted back around the axis A' of rotation of the hinge 17 in such a way that the end parts 13 that are vulcanized onto the coupling elements 11 on the facing side come to bear on each other. Here the end parts 13 with radial holes 16' are secured to drive member showed partially at 24 and the end parts 13 with axially throughgoing holes 16" are similarly bolted to a driven member shown partially at 25, although the part 24 could be the driven part and the part 25 the drive part.

The hinge 17 only serves for fitting the coupling elements to each in during assembly. It is not suitable for absorbing the shear and tensile forces generated during operation of the coupling. The end parts 13 coupled with the drive member or the driven member, serve to absorb shear and tension.

FIGS. 5 to 8 show a second embodiment of the invention. Here too, the coupling 10 comprises two approximately semi-circularly arcuate coupling elements 11 consisting of individual segments 12 each formed by a rubber body 14 between two end parts 13.

Figure 7:
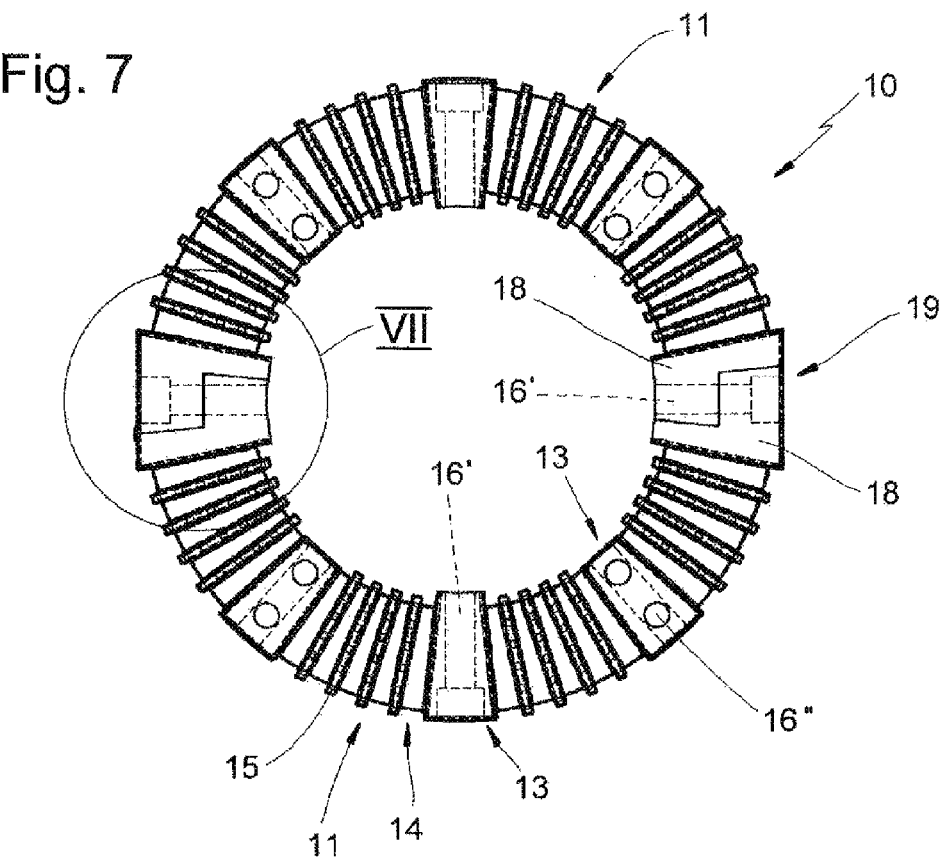
FIG. 7 is the coupling of FIG. 5 in closed position.
Figure 8:
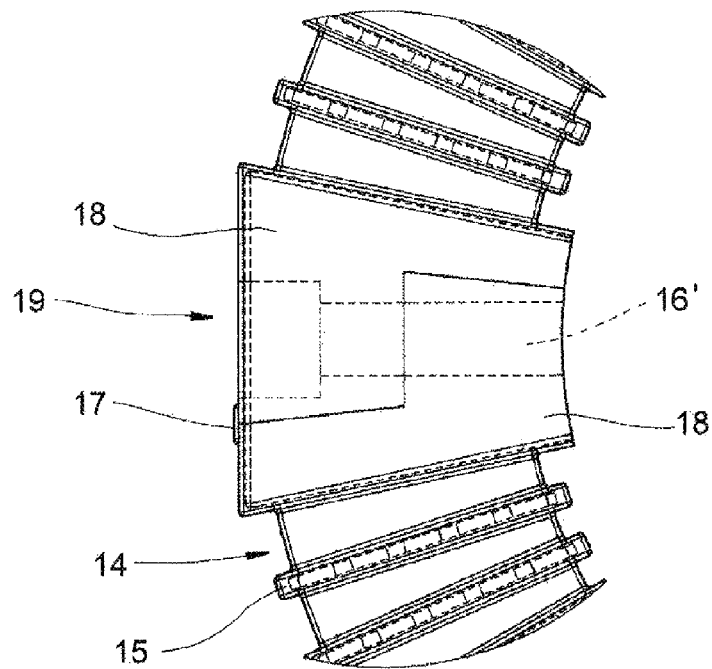
FIG. 8 is a large-scale view of the detail shown at VII in FIG. 7.
Figure 9:
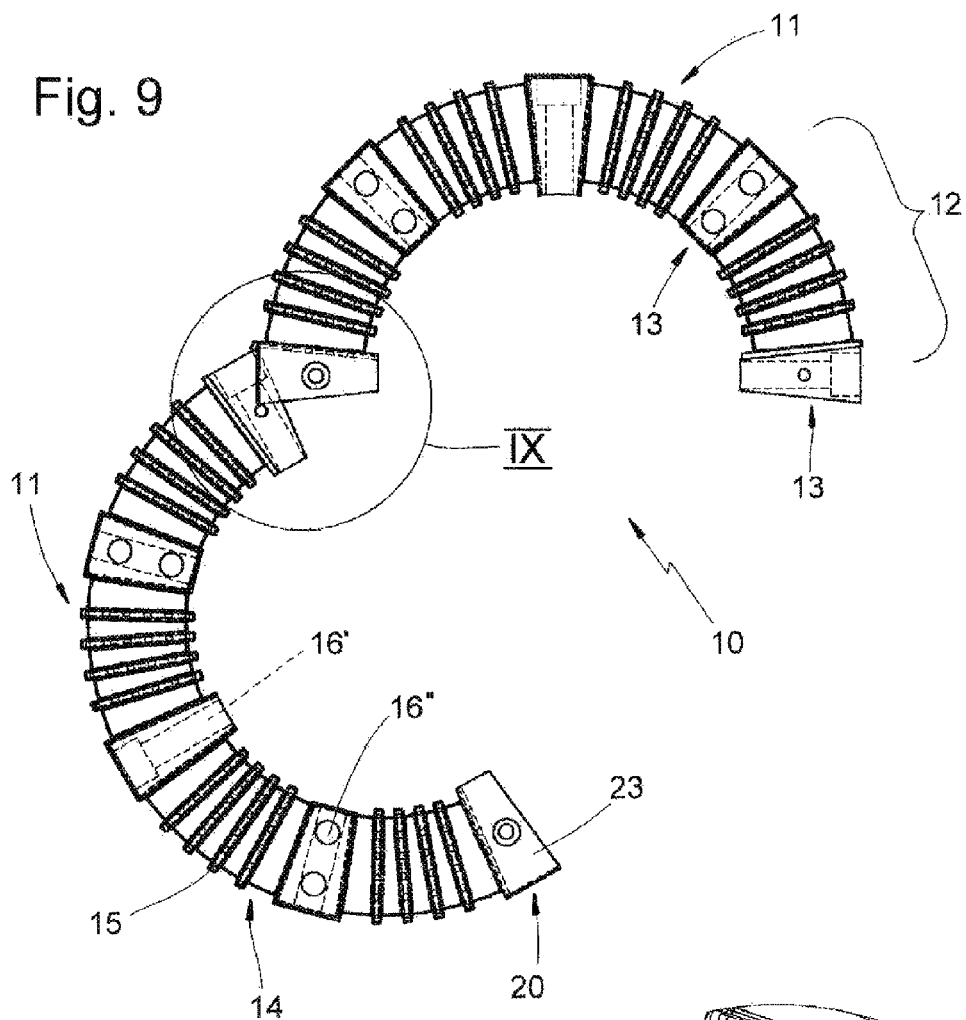
FIG. 9 is an end view of third embodiment of a coupling in accordance with the invention in open position.
Figure 10:
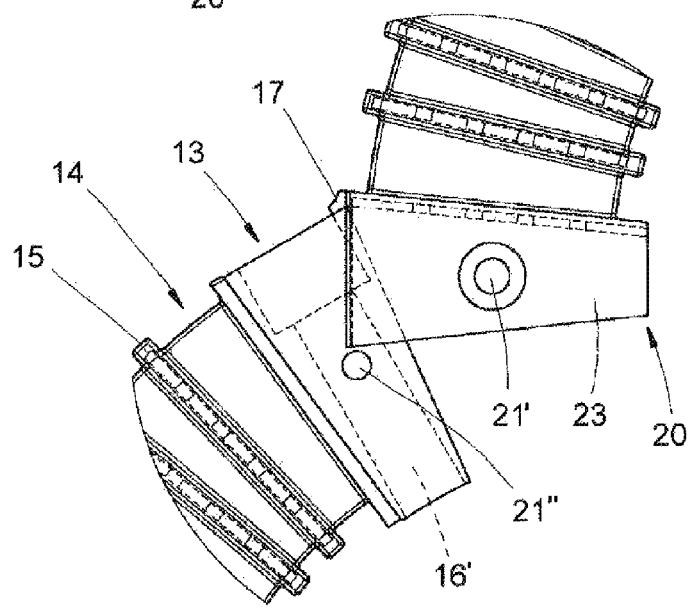
FIG. 10 is a large-scale view of the detail shown at IX in FIG. 9.
Figure 11:
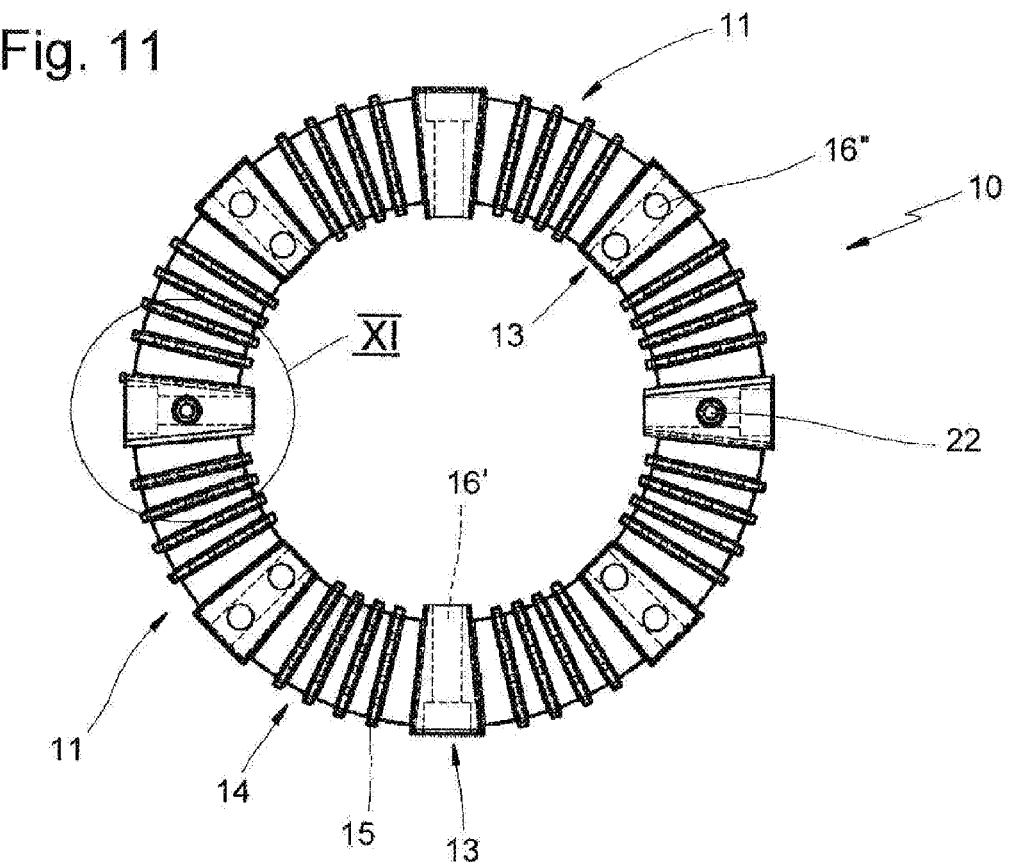
FIG. 11 is the coupling of FIG. 9 in closed position.
Figure 12:
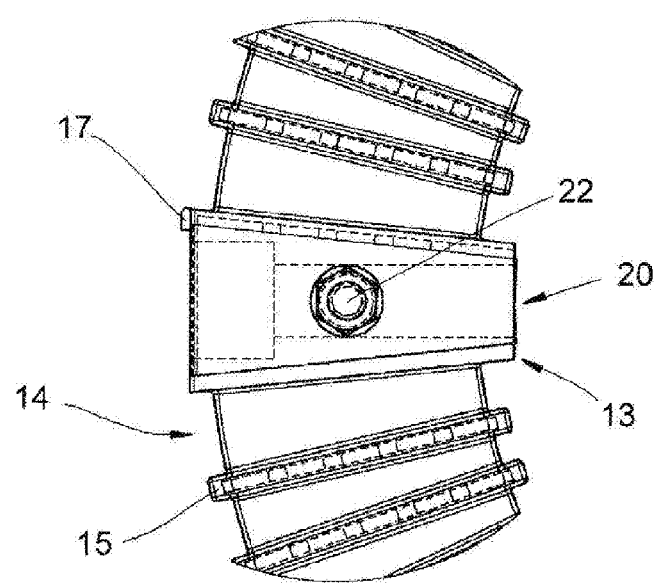
FIG. 12 is a large-scale view of the detail shown at XI in FIG. 11.
Figure 13:
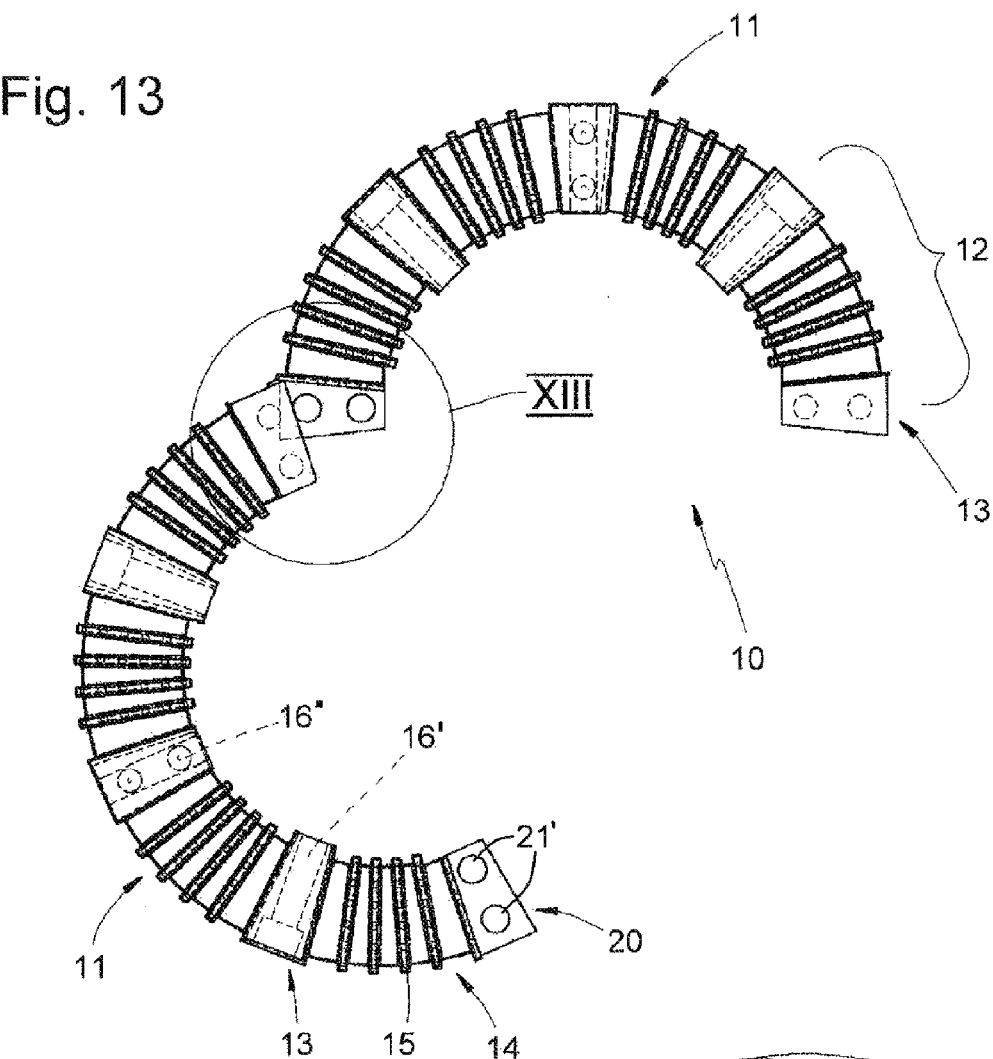
FIG. 13 is an end view of fourth embodiment of a coupling in accordance with the invention in open position.
Figure 14:
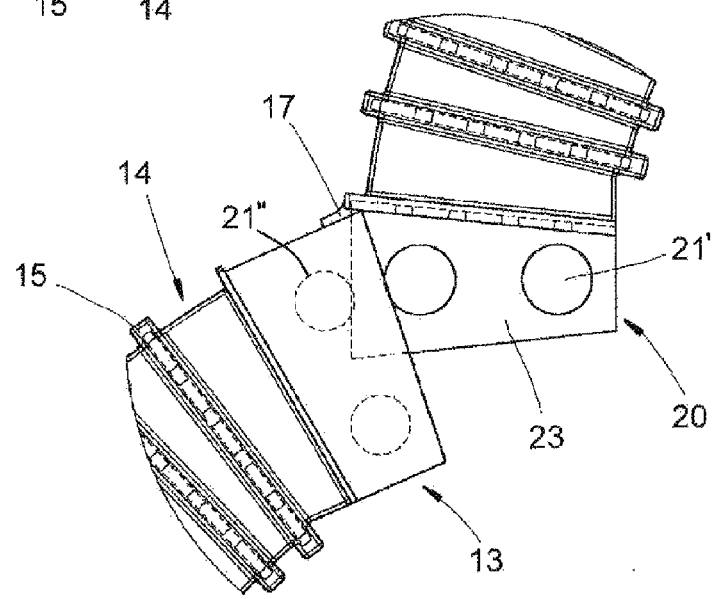
FIG. 14 is a large-scale view of the detail shown at XIII in FIG. 13.
Figure 15:
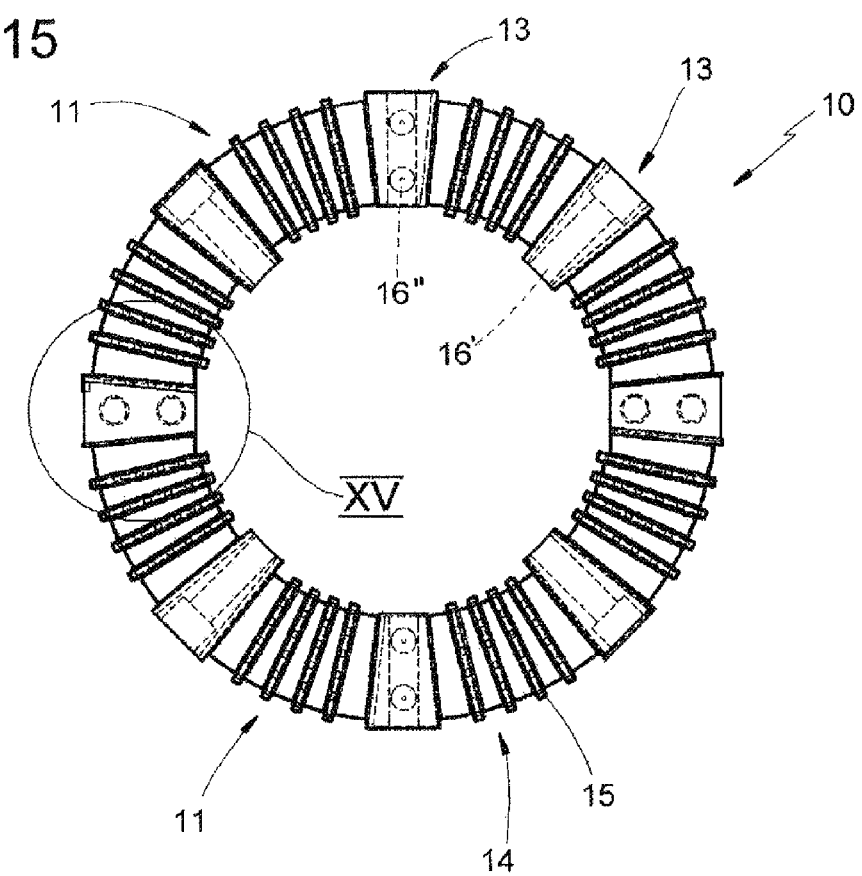
FIG. 15 is the coupling of FIG. 13 in closed position.
Figure 16:
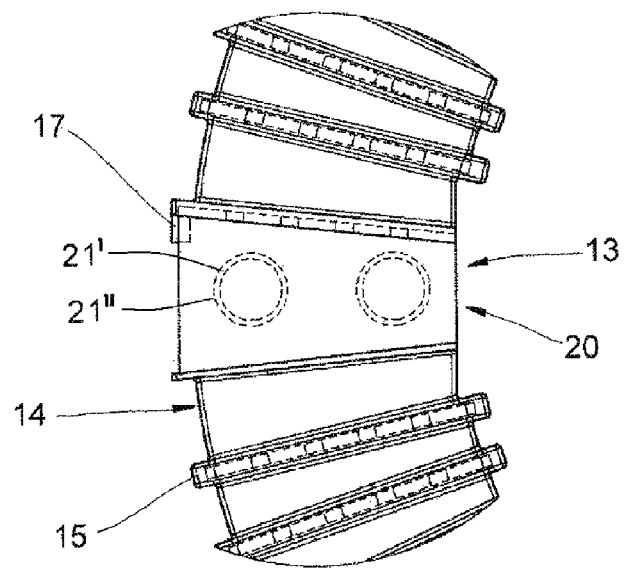
FIG. 16 is a large-scale view of the detail shown at XV in FIG. 15.
Figure 17:
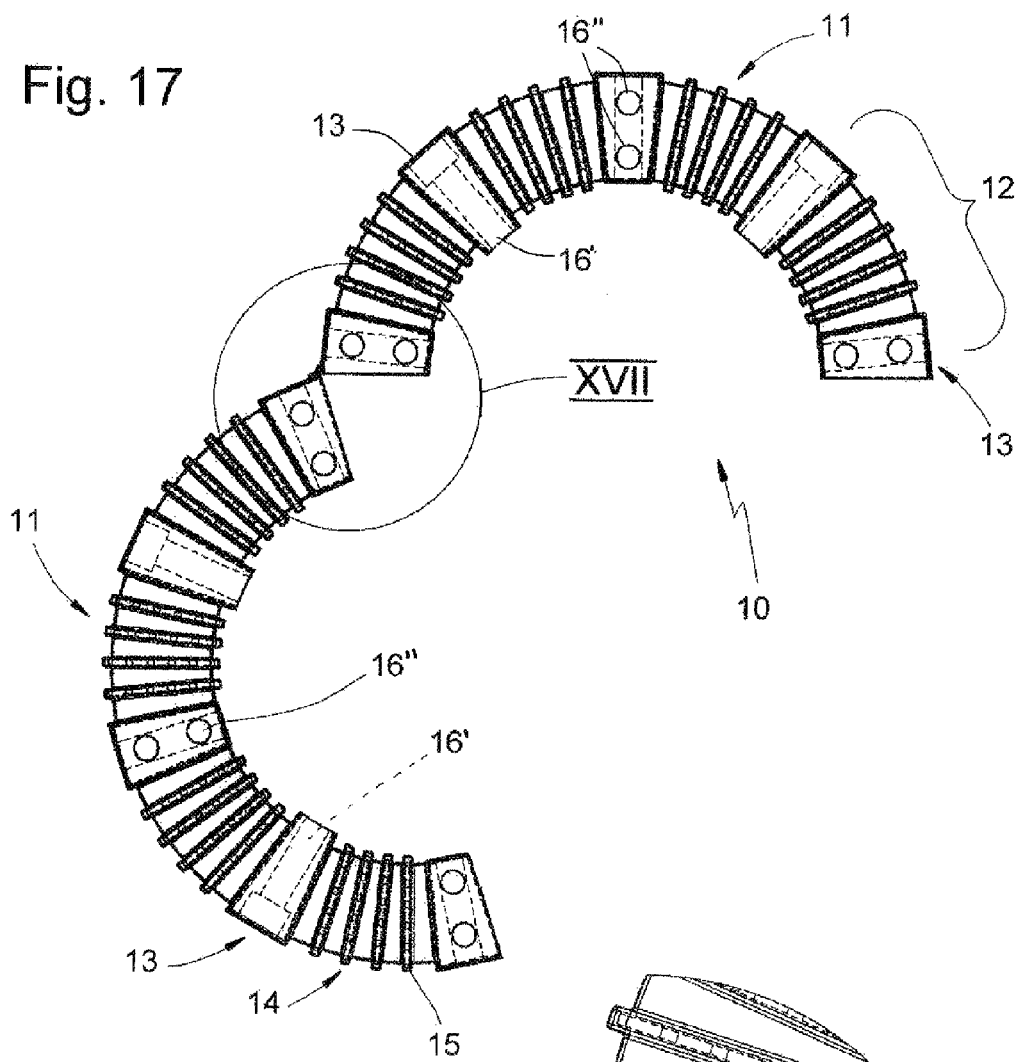
FIG. 17 is an end view of fourth embodiment of a coupling in accordance with the invention embodiment in open position.
Figure 18:
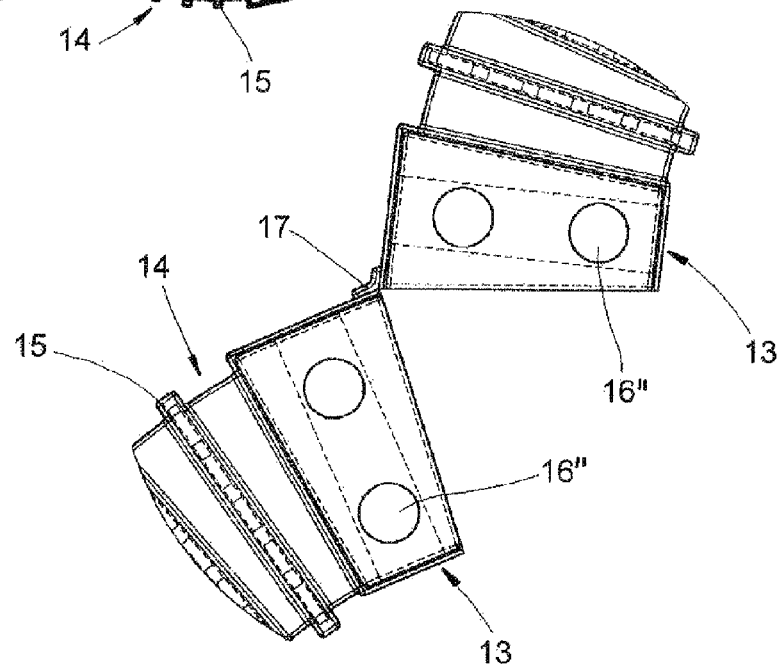
FIG. 18 is a large-scale view of the detail shown at XVII in FIG. 17.
Figure 19:
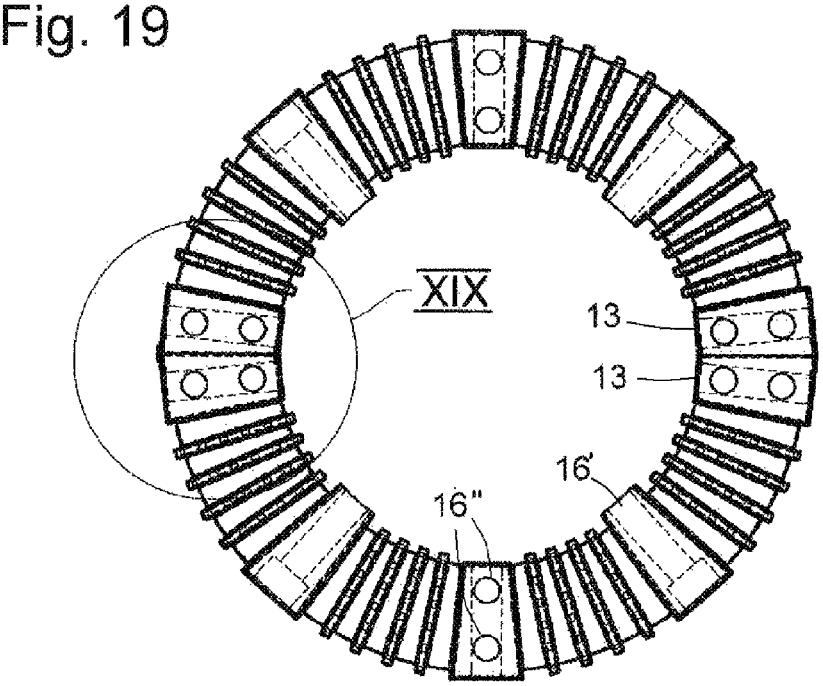
FIG. 19 is the coupling of FIG. 17 in closed position.
Figure 20:
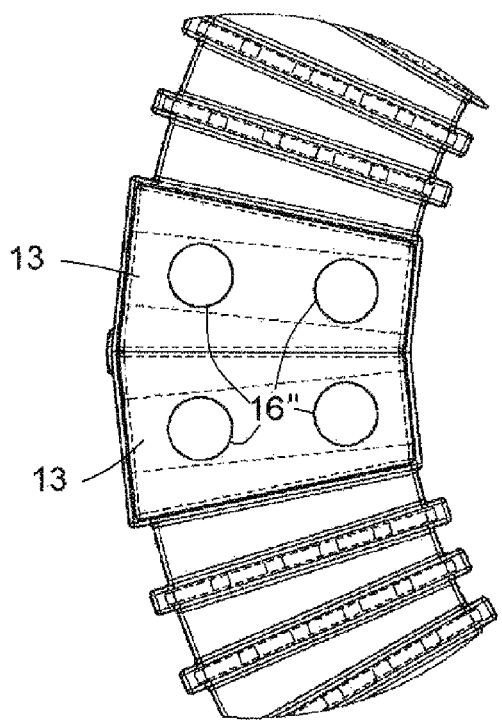
FIG. 20 is a large-scale view of the detail shown at XIX in FIG. 19.

In this second embodiment of the invention, at the ends of the semicircularly arcuate coupling elements 11 opposite the hinge 17, subparts 18 form a split end part 19 (see FIGS. 7 and 8). The end part 19 is split at a stepped face into the two subparts 18. This is achieved here in that an end part with a radially extending hole 16' has a stepped face with a radially inner part extending radially in a plane including the axis A but to one side of the respective hole 16', a radially outer part also extending radially in a plane including the axis A but to the other side of the hole 16', and a middle part extending tangentially of the axis A between the inner and outer parts and passing perpendicularly through the respective hole 16'. The two subparts 18 fit complementarily together so they together form the hole 16' and when a bolt or the like is inserted through the hole 16' they form, they are permanently joined together.

Even an end part 13 with axial attachment holes 16" can be designed as split end part 13. In this case, an inner part of a stepped end face extends in a plane perpendicular to the axis A to one side of and parallel to the respective bore 16", an outer part of the stepped end face extends in a plane perpendicular to the axis A to the other side of and parallel to the respective bore 16", and an intermediate face extending in a plane parallel to the axis and perpendicularly through the respective bore 16".

One of these end parts 19 is provided with the hinge 17 that in this case connects the respective two subparts 18 together. This hinge is identical with the one that was described with respect to the first embodiment (FIGS. 1 to 4) but that, instead, connected together two end parts 13 with respective bores 16'.

The important advantage of this embodiment is that for a connection able to work under pressure of the semicircularly arcuate coupling elements 11—in contrast to the first embodiment—only one mounting bolt that engages radially with the drive member or the driven member is required at the joint side of the coupling ring. It reaches through both aligned parts of the holes 16' or 16' through the subparts 18. In addition to simpler assembly, this embodiment requires two fewer end parts 13. Even with respect to the hub, processing is easier, since in the second embodiment two holes are sufficient instead of the four holes for the end parts at the hinge and diametrally opposite joint in the first embodiment.

A third embodiment of the invention is shown in FIGS. 9 to 12. Here too, the coupling 10 comprises two semicircularly arcuate coupling elements 11 formed of individual segments 12. Each segment 12 in turn has a rubber body 14 between two end parts 13 into which elasticity-reducing plates 15 have been vulcanized.

As a modification to the previous embodiments of the invention, one angularly directed end face of each semicircularly arcuate coupling element 11 is vulcanized to an end part 13 that can fit with a U-shaped extension 20 that has a pair of flanks or side plates 23 between which the first end part 13 can fit and that is fixed to the end of the other semicircular element 11. The side plates 23 are formed with throughgoing holes 21' alignable with a complementary hole 21" in the end part 13 so that a bolt 22 can extend through to secure the two parts 20 and 13 together. These holes 21 and 21" and the screw assembly 22 thus extend parallel to the respective axis A and perpendicular to and even through any bolt extending radially through the end part 13. The hinge 17 is formed between the parts 12 and 20.

A fourth embodiment of the coupling 10 in accordance with the invention is shown in FIGS. 13 to 16. It is identical in design and function with the embodiment of FIGS. 9 to 12. In contrast however, the end part 13 mounted on the angularly facing end has, however, not one radial but two axial holes 21", so the end part 13 can be bolted to a drive member or a driven member. Consequently, even the extension 20 has two axial holes 21' in its side walls 23. These are aligned in the closed condition of coupling 10 shown in FIGS. 15 and 16 with the axial holes 21" of the end part 13. This has the important advantage that the two coupling elements 11 are connected and able to bear a load by means of the bolts that fasten the coupling to the drive or driven member. The separate attachment required in the embodiment according to FIGS. 9 to 12 can be eliminated here.

Finally, FIGS. 17 to 20 show a fifth embodiment of the coupling 10 in accordance with the invention. This is a coupling designed in function and structure analogous to the first embodiment of the invention as shown in FIGS. 1-4. The important difference is that the end parts 13 that are vulcanized onto the ends of the semicircularly arcuate coupling elements 11 are provided with axial holes 16 for mounting on the drive or driven member. The coupling 10 offers the important advantage of being formed integrally, in contrast to the prior art.

The costly elasticity tests of the individual segments and their storage corresponding to elasticity values as is known in prior art for wedge packet couplings are eliminated. Coupling 10 can be vulcanized ready for assembly in a single production step. Beyond that, it has important advantages in assembly. As the segments 12 are integrally linked with each other, a small number of end parts 13 is required, which makes faster assembly possible

I claim:

1. A coupling element for connection between a drive member and a driven member for transmitting torque, the element comprising:
    at least two similar part-circularly arcuate coupling bodies each formed by an arcuate row of elastomeric segments alternating with and vulcanized to rigid elasticity-limiting elements, each row terminating at two respective end parts at least one of which is formed with an axially or radially throughgoing hole for attachment to the drive and driven members, two of the end parts of different rows being adjacent and in direct engagement with each other in a closed position of the coupling element with the rows forming a closed circle centered on an element axis; and
    a hinge engaged between the two adjacent end parts for pivotal movement of the part-circular coupling bodies about a hinge axis parallel to the element axis between the closed position and an open position with the two adjacent end parts substantially out of engagement with each other.

2. The coupling element defined in claim 1 wherein there are two such coupling bodies of semicircular shape and the hinge is a single hinge.

3. The coupling element defined in claim 2 wherein the hinge is unitarily formed with the two adjacent end parts.

4. The coupling element defined in claim 3 wherein the hinge is vulcanized to two of the end parts.

5. The coupling element defined in claim 1 wherein the rigid elements are metal plates extending radially of the axis.

6. The coupling element defined in claim 1 wherein the segments are wedge shaped and taper toward the axis.

7. The coupling element defined in claim 1 wherein each of the end parts is formed with at least one of the attachment holes.

8. The coupling element defined in claim 7 wherein radial attachment holes alternate angularly with axial attachment holes or groups thereof.

9. A coupling element for connection between a drive member and a driven member for transmitting torque, the element comprising:
    two similar semicircular coupling bodies each formed by an arcuate row of elastomeric segments alternating with and vulcanized to rigid elasticity-limiting elements, the rows terminating at end parts formed with axially or radially throughgoing holes for attachment to the drive and driven members, two of the end parts generally diametrally opposite the hinge having angularly engaging nonplanar end faces; and
    a single hinge unitarily formed with two of the end parts for movement of the part-circular coupling bodies between a closed position forming a closed circle centered on an axis and an open position.

10. The coupling element defined in claim 9 wherein one of the two end parts is U-shaped and fits around the other of the two end parts.

11. The coupling element defined in claim 9 wherein each of the two end parts has a planar outer face part and an planar inner face part offset angularly from the outer face part, and an intermediate part extending angularly between and bridging the inner and outer face parts.

12. The coupling element defined in claim 11 wherein one of the radial holes lies between the inner and outer face parts and extends radially through both of the two end parts.

13. The coupling element defined in claim 9 wherein each of the two end parts has a planar outer face part and an planar inner face part offset axially from the outer face part, and an intermediate part extending angularly between and bridging the inner and outer face parts.

14. The coupling element defined in claim 9 wherein the two end parts engage at planar end faces extending radially of the axis, each of the two end parts being formed with at least one of the axial or radial attachment holes.

15. A coupling element for connection between a drive member and a driven member for transmitting torque, the element comprising:
    at least two similar part-circularly arcuate coupling bodies each formed by an arcuate row of elastomeric segments alternating with and vulcanized to rigid elasticity-limiting elements, each of the rows terminating at two respective end parts of which only one is formed with an axially or radially throughgoing hole for attachment to the drive and driven members, each of the end parts in a closed position of the element with the rows forming a closed circle centered on an axis directly engaging one of the adjacent end parts of a different row, one of the adjacent end parts angularly overlapping and fitting angularly with the other of the adjacent end parts; and
    a hinge for pivotal movement of the part-circular coupling bodies about a hinge axis parallel to the element axis between the closed position an open position.

16. A coupling element for connection between a drive member and a driven member for transmitting torque, the element comprising:

at least two similar part-circularly arcuate coupling bodies each formed by an arcuate row of elastomeric segments alternating with and vulcanized to rigid elasticity-limiting elements, the rows terminating at end parts each formed with an axially or radially throughgoing hole for attachment to the drive and driven members, each end part having stepped faces angularly engaging in a closed position of the element with the rows forming a closed circle centered on an element axis with a complementarily stepped face of an end part of an adjacent row; and a hinge for pivotal movement of the part-circular coupling bodies about a hinge axis parallel to the element axis between the closed position and an open position.

* * * * *